United States Patent [19]
Park

[11] Patent Number: 5,692,695
[45] Date of Patent: Dec. 2, 1997

[54] MOVING ELEMENTS AUTOMATIC TRANSFERRING APPARATUS FOR MAGNETIC RECORDING AND REPRODUCING APPARATUS

[75] Inventor: Hong-Soo Park, Seoul, Rep. of Korea

[73] Assignee: LG Electronics Inc., Seoul, Rep. of Korea

[21] Appl. No.: 562,514

[22] Filed: Nov. 24, 1995

[30] Foreign Application Priority Data

Nov. 26, 1994 [KR] Rep. of Korea ............ 31365/1994

[51] Int. Cl.$^6$ ............................................. G11B 15/00
[52] U.S. Cl. ............................................. 242/336
[58] Field of Search ............................ 242/336; 360/94

[56] References Cited

U.S. PATENT DOCUMENTS

| | | | |
|---|---|---|---|
| 4,664,337 | 5/1987 | Shiratori | 242/336 |
| 4,984,109 | 1/1991 | Yokoo | 242/336 |
| 5,082,195 | 1/1992 | Saito et al. | 242/336 |

FOREIGN PATENT DOCUMENTS

| | | | |
|---|---|---|---|
| 60-40546 | 3/1985 | Japan | 242/336 |
| 2-281451 | 11/1990 | Japan | 242/336 |

*Primary Examiner*—John P. Darling
*Attorney, Agent, or Firm*—Birch, Stewart, Kolasch & Birch, LLP

[57] ABSTRACT

An improved moving elements automatic transferring apparatus for a magnetic recording and reproducing apparatus capable of more simply transferring moving elements such as a reel table, a hub lock release member, and an identification board detection apparatus, which includes two reel tables; a reversibly rotatable pinion disposed between the reel tables; a plate having an elliptical slot, the plate being movable upwardly or downwardly; a rack engaged to a gear portion of the pinion, the rack being linearly movable, and having a hub lock release member disposed at one end thereof; two connection bars each having one end connected to the reel table, and the other end provided with a pin, respectively, of which one connection bar is hinged to the central portion of the pinion and the other connection bar is rigidly connected to the pinion; and spaced-apart two pins provided at ends of the connection bar and inserted into the slot.

19 Claims, 7 Drawing Sheets

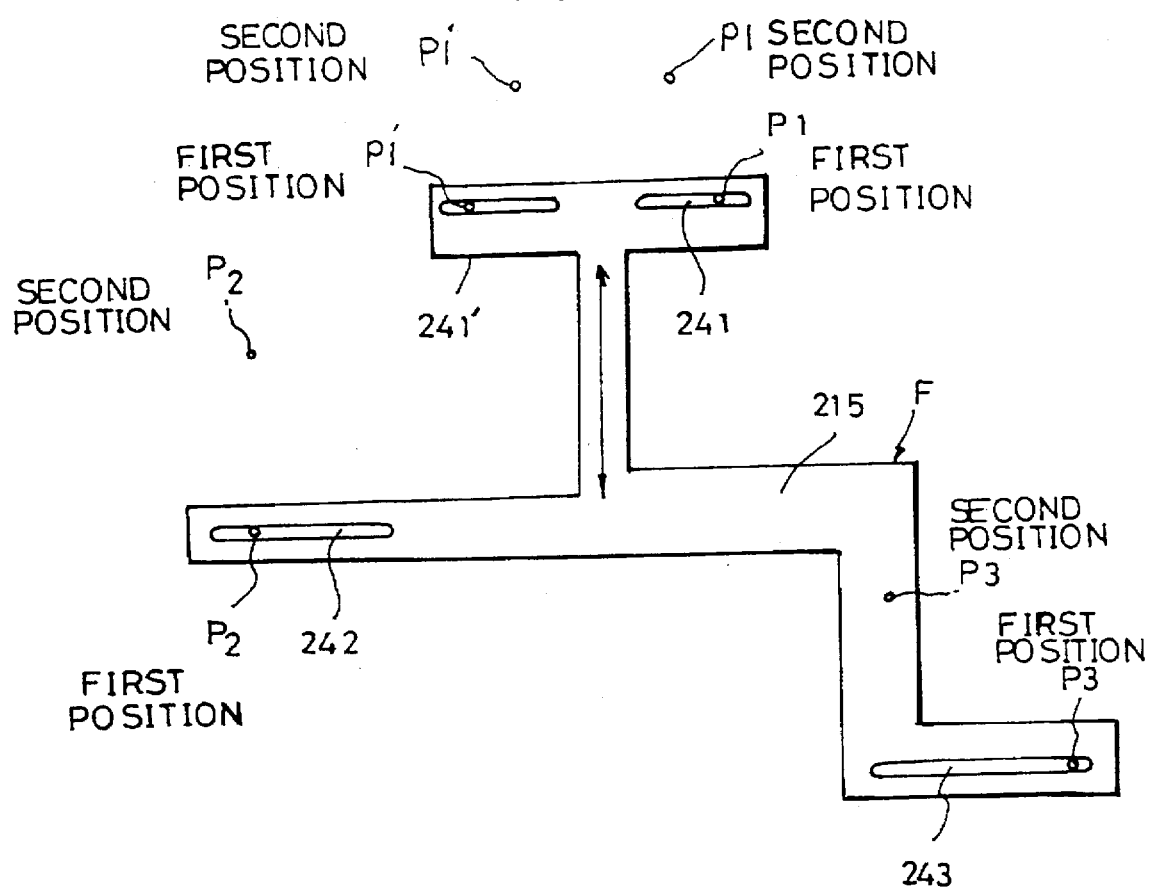

MOVING ELEMENTS AUTOMATIC TRANSFERRING APPARATUS FOR MAGNETIC RECORDING AND REPRODUCING APPARATUS

BACKGROUND OF THE INVENTION

1. Field of the Invention

The present invention relates to a moving elements automatic transferring apparatus for a magnetic recording and reproducing apparatus, and particularly to an improved moving elements automatic transferring apparatus for a magnetic recording and reproducing apparatus capable of more simply transferring moving elements such as a reel table, a hub lock release member, and an identification board detection apparatus.

2. Description of the Conventional Art

Conventionally, in order to use a different size cassette in one video deck, there is known a method of selectively changing a reel position in a video deck. In this regard, a Japanese patent No. 2-285546 disclosed a reel position transferring apparatus for a magnetic recording and reproducing apparatus in connection with the above-mentioned method. The apparatus of Japanese patent '546 will now be explained.

Referring to FIG. 1, a shift motor 34, which is a driving source, is disposed in the central portion of the deck, and a worm 35 is disposed on the upper portion of the shift motor 34.

Two worm wheels 36 and 42 are disposed at both sides of the worm 35, and the worm wheels 36 and 42 contact with the worm 35.

Drive timing pulleys 38 and 44 and wheel shafts 37 and 43 are integrally engaged with the worm wheels 36 and 42 in the worm wheels 36 and 42.

In addition, timing belts 40 and 46 are engaged to the drive timing pulleys 38 and 44, and following timing pulleys 39 and 45 are engaged to the other end of the timing belts 40 and 46.

In addition, a reel bar 2 integrally movable with movable bars 3 and 4 is disposed at one sides of the timing belts 40 and 46 in which the other sides of the movable bars 3 and 4 are supported to guide members 5 and 6.

First stoppers 10 and 11 are disposed at a lower portion between the timing belts 40 and 46 and the movable bars 3 and 4, and second stoppers 14 and 15 are provided at a higher position, and a solenoid flange 20 is disposed between the second stoppers 14 and 15.

The operation of a conventional reel position transferring apparatus will now be explained.

When the worm 35 rotates in accordance with a driving force, transmitted thereto, of the shift motor 34, the worm wheels 36 and 42 contacting with the worm 35 rotate thereby.

At this time, the drive timing pulleys 38 and 44 integral with the worm wheels 36 and 42 rotate about the worm wheels 37 and 43.

Therefore, the timing belts 40 and 46 wound onto the drive timing pulleys 38 and 44 rotate about an axis of the drive timing pulleys 38 and 44 and the following timing pulleys 39 and 45 in accordance with a rotation of the drive timing pulleys 38 and 44.

At this time, the movable bars 3 and 4 and the reel bar 2 integrally move together with the guide members 5 and 6 by a drive of the timing belts 40 and 46.

In addition, the first stoppers 10 and 11 are provided so as to move the movable bars 3 and 4 and the reel bar 2 to a certain position so that a big size cassette can be driven, and the second stoppers 14 and 15 are provided so as to move the movable bars 3 and 4 and the reel bar 2 to a certain position so that a small size cassette can be driven, and the solenoid flange 20 is provided so as to move the positions of the movable bars 3 and 4 and the reel bar 2 to a certain position so that an intermediate size cassette can be movable.

However, as described above, the conventional reel position transferring apparatus for a magnetic recording and reproducing apparatus has a more complex construction and includes many parts which are more expensive, and manufacturing the product is very costly.

SUMMARY OF THE INVENTION

Accordingly, it is an object of the present invention to provide a moving elements automatic transferring apparatus for a magnetic recording and reproducing apparatus, which overcome the problems encountered in a conventional moving elements automatic transferring apparatus for a magnetic recording and reproducing apparatus.

It is another object of the present invention to provide an improved moving elements automatic transferring apparatus for a magnetic recording and reproducing apparatus capable of more simply transferring moving elements such as a reel table, a hub lock release member, and an identification board detection apparatus.

To achieve the above objects, in accordance with a first embodiment of the present invention, there is provided a moving elements automatic transferring apparatus for a magnetic recording and reproducing apparatus, which includes two reel tables; a reversibly rotatable pinion disposed between the reel tables; a plate having an elliptical slot, the plate being movable upwardly or downwardly; a rack engaged to a gear portion of the pinion, the rack being linearly movable, and having a hub lock release member disposed at one end thereof; two connection bars each having one end connected to the reel table, and the other end provided with a pin, respectively, of which one connection bar is hinged to the central portion of the pinion and the other connection bar is rigidly connected to the pinion; and spaced-apart two pins provided at ends of the connection bar and inserted into the slot.

To achieve the above objects, in accordance with a second embodiment of the present invention, there is provided a moving elements automatic transferring apparatus for a magnetic recording and reproducing apparatus, which includes two reel tables; a plurality of reversibly rotatable pinions disposed between the reel tables, the pinions being intermeshed to each other; a rack engaged to a gear portion of the pinions, the rack being linearly movable, and having a hub lock release member disposed at one end thereof; and a pair of connection bars rotatably having one end engaged to the reel tables and the other end rotatably engaged to the center portion of one of the pinions.

To achieve the above objects, in accordance with a third embodiment of the present invention, there is provided a moving elements automatic transferring apparatus for a magnetic recording and reproducing apparatus, which includes two reel tables; a rotation center shaft of the reel tables disposed at the same distance from a position of the reel tables in which various kinds of cassette are available; a pair of first link members having pin joints disposed at both sides thereof for connecting the reel tables and the rotation center shaft thereof; a pair of first connection bars disposed at a predetermined portion of the first link members; a hub lock release member; a rotation center shaft of the hub lock release member disposed at the same distance from the hub lock release member in which various kinds of cassettes are available; a second link member having pin joints at both sides thereof for connecting the hub lock release member and the rotation center shaft thereof; a second connection member disposed at a predetermined portion of the second link member; an ID board detection apparatus; an ID board detection apparatus rotation center shaft disposed at the same distance from the ID board locking apparatus in which a small size cassette and a standard size cassette are available; a third link member having pin joints at both sides for connecting the ID board detection apparatus and the rotation center shaft thereof; a third connection member disposed at a predetermined portion of the third link member; and a function plate disposed so that each connection member is inserted into a corresponding portion and having a horizontally elongated second opening and a horizontally elongated third opening for moving the reel tables, the hub lock release member, and the ID board detection apparatus toward a corresponding position for various kinds of cassette sizes, wherein straight moving distance of a cassette of each connection member in the cassette insertion direction are the same when a certain cassette is inserted and a corresponding element moves.

BRIEF DESCRIPTION OF THE DRAWINGS

FIG. 9 is a plan view showing a construction of a function plate of a moving elements automatic transferring apparatus for a magnetic recording and reproducing apparatus of a third embodiment according to the present invention.

DETAILED DESCRIPTION OF THE INVENTION

Figure 1:
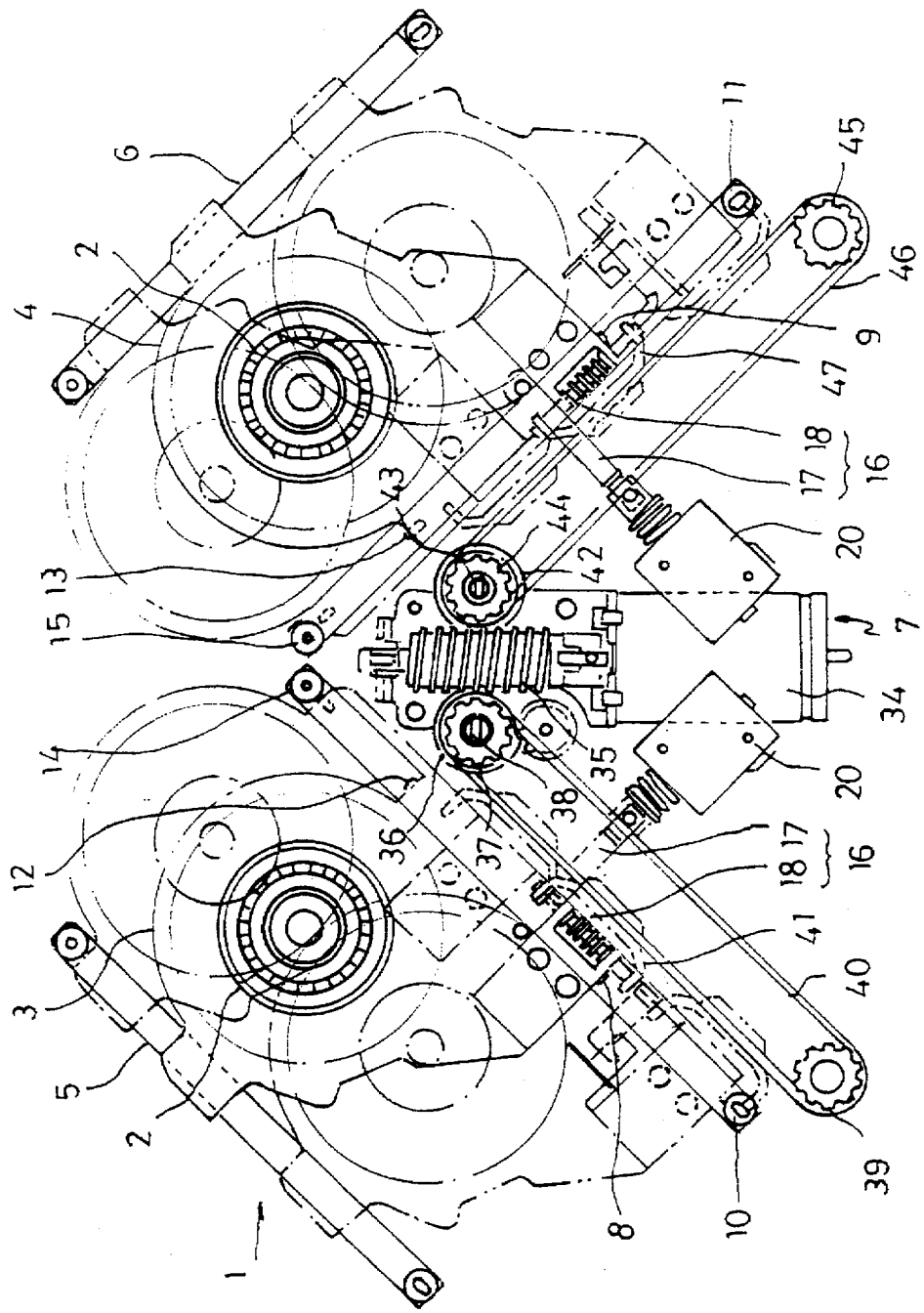
FIG. 1 is a plan view showing a moving elements automatic transferring apparatus for a conventional magnetic recording and reproducing apparatus.
Figure 2:
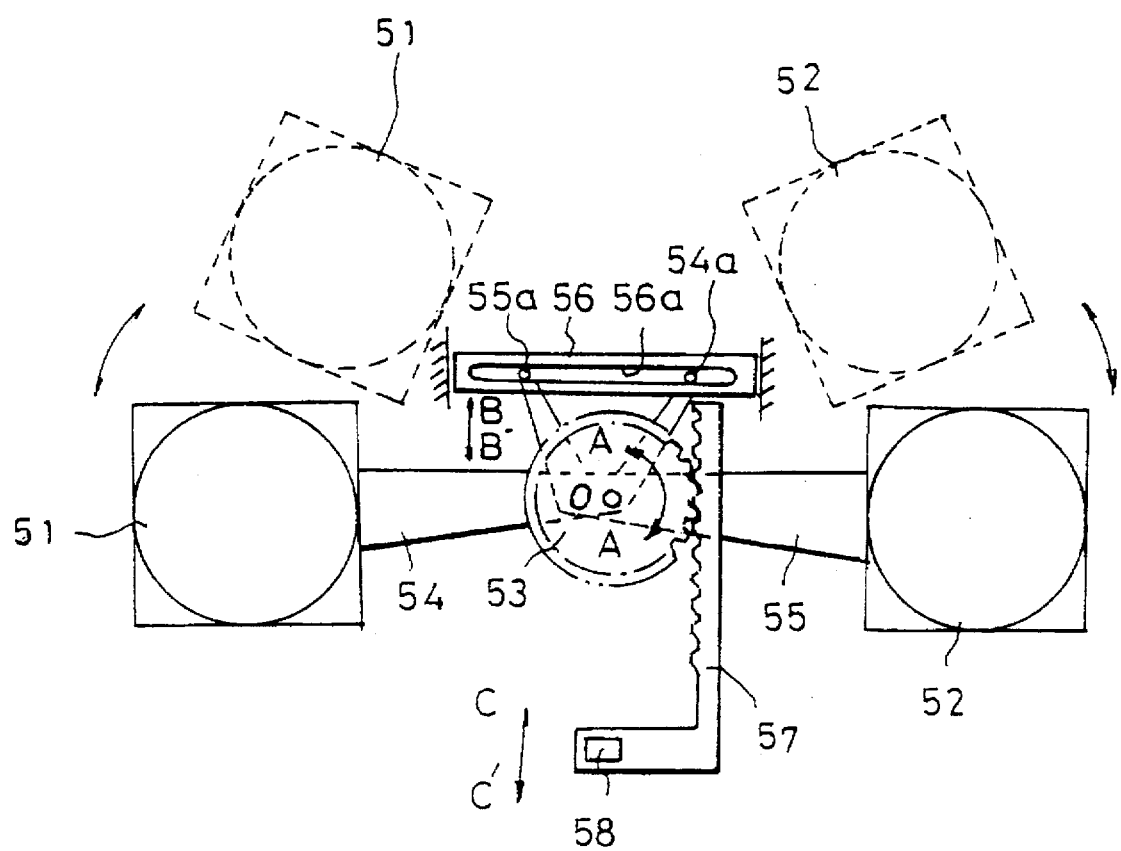
FIG. 2 is a plan view showing a moving elements automatic transferring apparatus for a magnetic recording and reproducing apparatus of a first embodiment according to the present invention.

Referring to FIG. 2, a moving elements automatic transferring apparatus for a magnetic recording and reproducing apparatus of a first embodiment according to the present invention will now be explained.

A pinion 53 is disposed at an intermediate portion of the reel tables 51 and 52 of the deck (not shown) for receiving a certain driving force.

In addition, a plate 56 having an elliptical slot 56a formed in its interior is disposed at a periphery of the pinion 53.

A linearly movable rack 57 is intermeshed with the threaded portion of the pinion 53 and includes a hub lock release member 58 disposed at a predetermined portion thereof.

Meanwhile, one of connection bars 54 and 55 is hinged about a hinge point "o" for connecting the pinion 53 to the reel tables 51 and 52. In addition, the other one of the connection bars 54 and 55 is rigidly fixed to the pinion 53. One end of each connection bars 54 and 55 is connected to the reel tables 51 and 52, and the other end thereof has pins 54a and 55a. The spaced-apart pins 54a and 55a are inserted into the slot 56a formed on the plate 56, respectively.

Therefore, the plate 56 is movable only in the upward and downward directions, and the connection bars 54 and 55 are supported by the plate 56.

The operation of a first embodiment of the present invention will now be explained with reference to accompanying drawings.

To begin with, when the cassette size is identified by a sensor (not shown) disposed at a periphery of a predetermined portion where cassette is inserted, the pinion 53 receives a certain driving force from a driving source and rotates in the direction of the arrows A or A' as shown in FIG. 2.

If when the pinion 53 rotates by a predetermined angle about the hinge point "o" in the direction "A", the pin 54a fixed to the connection bar 55 moves in the counterclockwise direction about the hinge point "o", and the pin 55a fixed to the connection bar 54 moves in the clockwise direction about the hinge point "o".

That is, the pins 54a and 55a move inwardly from the slot 56a.

Therefore, the plate 56 moves in the direction "B", sliding with respect to the slot 56a of the plate by the movement of the pin 55a.

The reel tables 51 and 52 moves as drawing a circular about the hinge point "o" to a predetermined upper position, so that the small size cassette is placed at its proper position.

At the same time, as the reel tables 51 and 52 move toward the upward portion, the hub lock release member 58 moves to the direction "C" as shown in FIG. 2 together with the rack 7 by a predetermined distance, so that the small size cassette can be placed.

Meanwhile, when varying the position of the reel so as to use a standard size cassette, since the reverse operation with respect to the above operation should be executed, the same will be omitted.

A moving elements automatic transferring apparatus for a magnetic recording and reproducing apparatus of a second embodiment according to the present invention will now be explained with reference to accompanying drawings.

Figure 3:
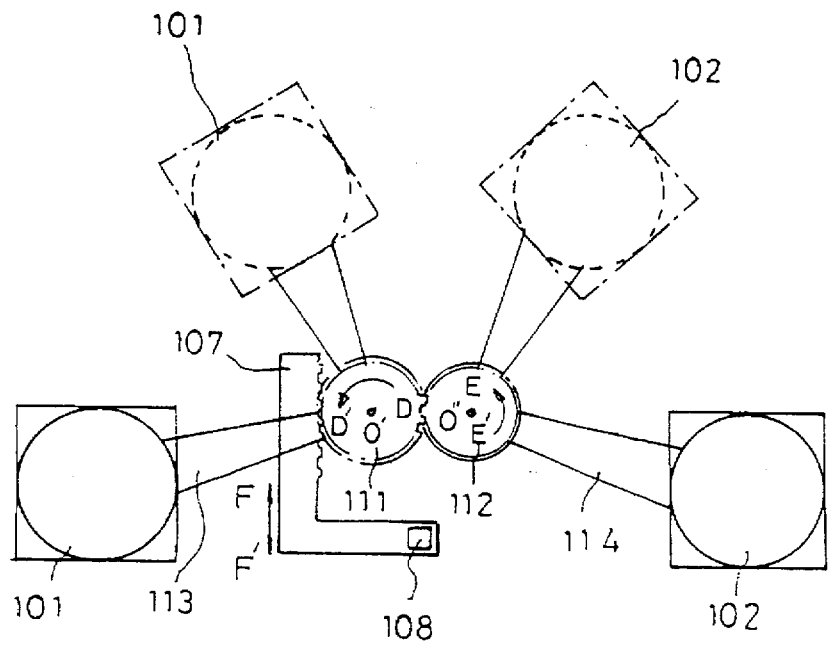
FIG. 3 is a plan view showing a moving elements automatic transferring apparatus for a magnetic recording and reproducing apparatus of a second embodiment according to the present invention.

To begin with, referring to FIG. 3, intermeshed first and second pinions 111 and 112 are provided at the intermediate portion of the reel tables 101 and 102 of the deck (not shown) and are rotatable in the counterclockwise or clockwise directions by receiving a predetermined driving force from a driving source (not shown).

A linearly movable rack 107 is engaged with the gear portion of the first pinion 111, and includes a hub lock release member 108 disposed at a predetermined portion thereof, that is, the portion that the gear is not provided.

Meanwhile, connection bars 113 and 114 for connecting the first pinion 111 and the second pinion 112 to the reel tables 101 and 102, respectively, are rotatably engaged to a center portion of the first pinion 111 and the second pinion 112 about points "o" and "o'". The other end of each the connection bars 113 and 114 is connected to the reel tables 101 and 102, respectively.

The operation of the second embodiment according to the present invention will now be explained.

When a sensor (not shown) identifies the size of a cassette disposed at a predetermined portion of a periphery where the cassette is inserted therein from the outside, the first pinion 111 receives a predetermined force from a driving source (not shown), and the first pinion 111 rotates in the direction "D" as shown in FIG. 3.

When the first pinion 111 rotates about a hinge point "o'" in the direction "D" by a predetermined angle, the reel table 101 moves from the lower portion to the upper portion, and when the second pinion 112 rotates about a hinge point "o''" in the direction "E" by a predetermined angle, the reel table 102 moves from the lower portion to the upper portion.

That is, the pair of the reel tables 101 and 102 move toward the upper portion of the system as drawing a circle about the hinge points "o'" and "o''", and the small size cassette is placed at a predetermined portion.

At this same time, the hub lock release member 108 moves in the direction "F" together with the rack 107 as shown in FIG. 3, and the small size cassette is placed at a predetermined portion.

Figure 4:
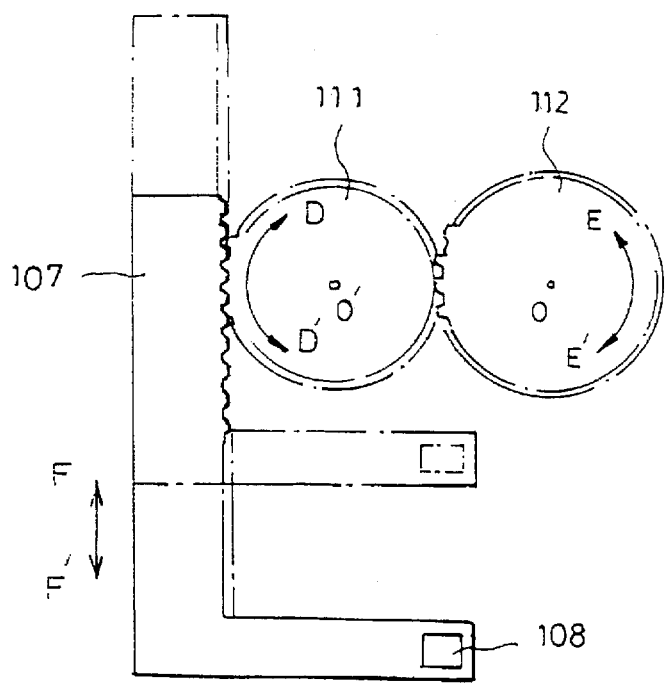
FIG. 4 is a view showing a relationship between a reel table and a hub lock release member of a moving elements automatic transferring apparatus for a magnetic recording and reproducing apparatus of a second embodiment according to the present invention.

FIG. 4 shows a relationship between the reel table and hub lock release member of the second embodiment of the present invention.

Meanwhile, in the same state above, when varying the position of the reel so as to use a standard cassette, since the reverse operation with respect to the above operation is executed, the operation will now be omitted.

A moving elements automatic transferring apparatus for a magnetic recording and reproducing apparatus of a third embodiment according to the present invention will now be explained with reference to accompanying drawings.

The third embodiment adopts the same elements of the reel table, the hub lock release member, and the ID board detection apparatus of the first and second embodiments of the present invention.

Figure 5:
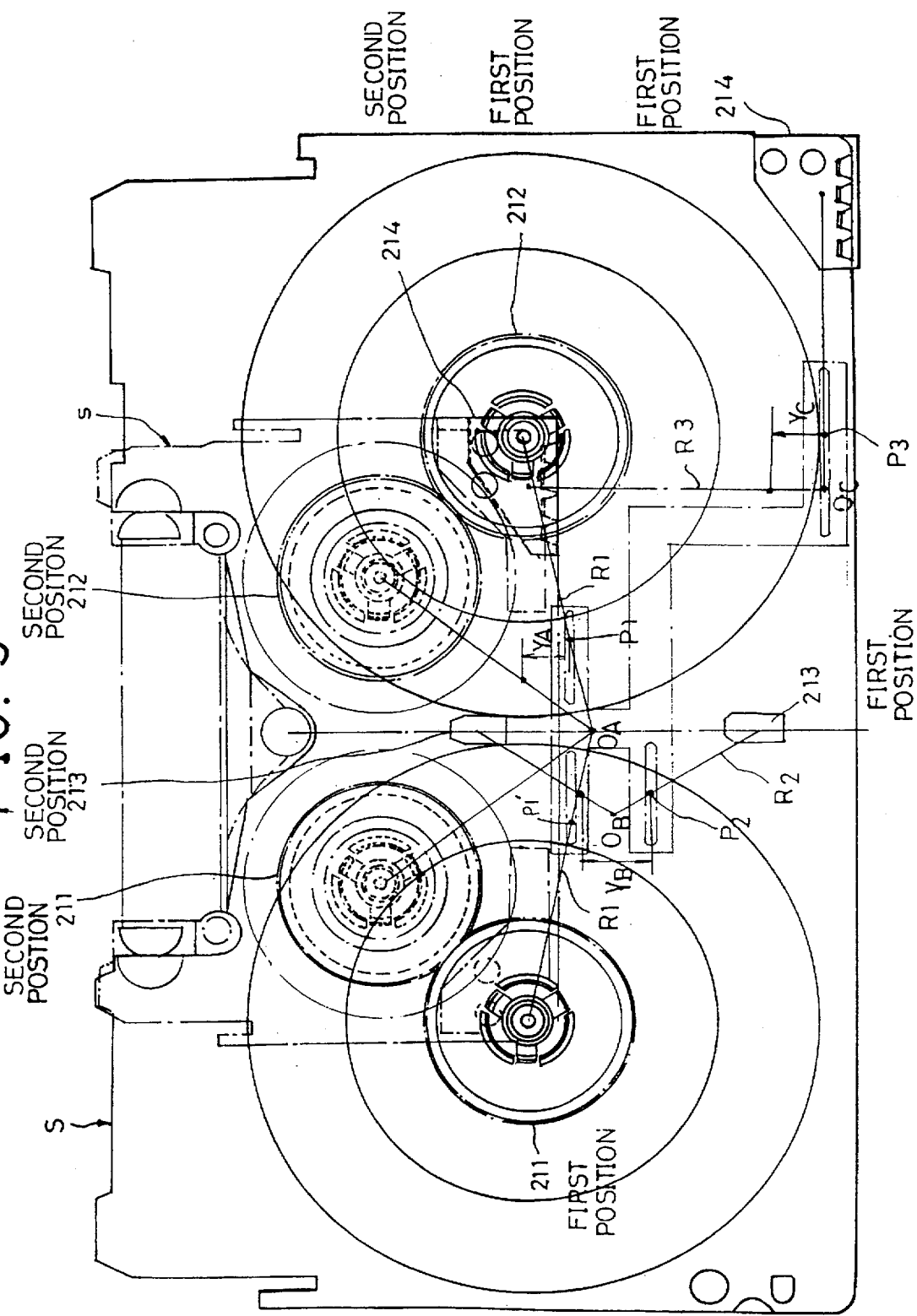
FIG. 5 is a plan view showing a moving elements automatic transferring apparatus of a magnetic recording and reproducing apparatus of a third embodiment according to the present invention.
Figure 6:
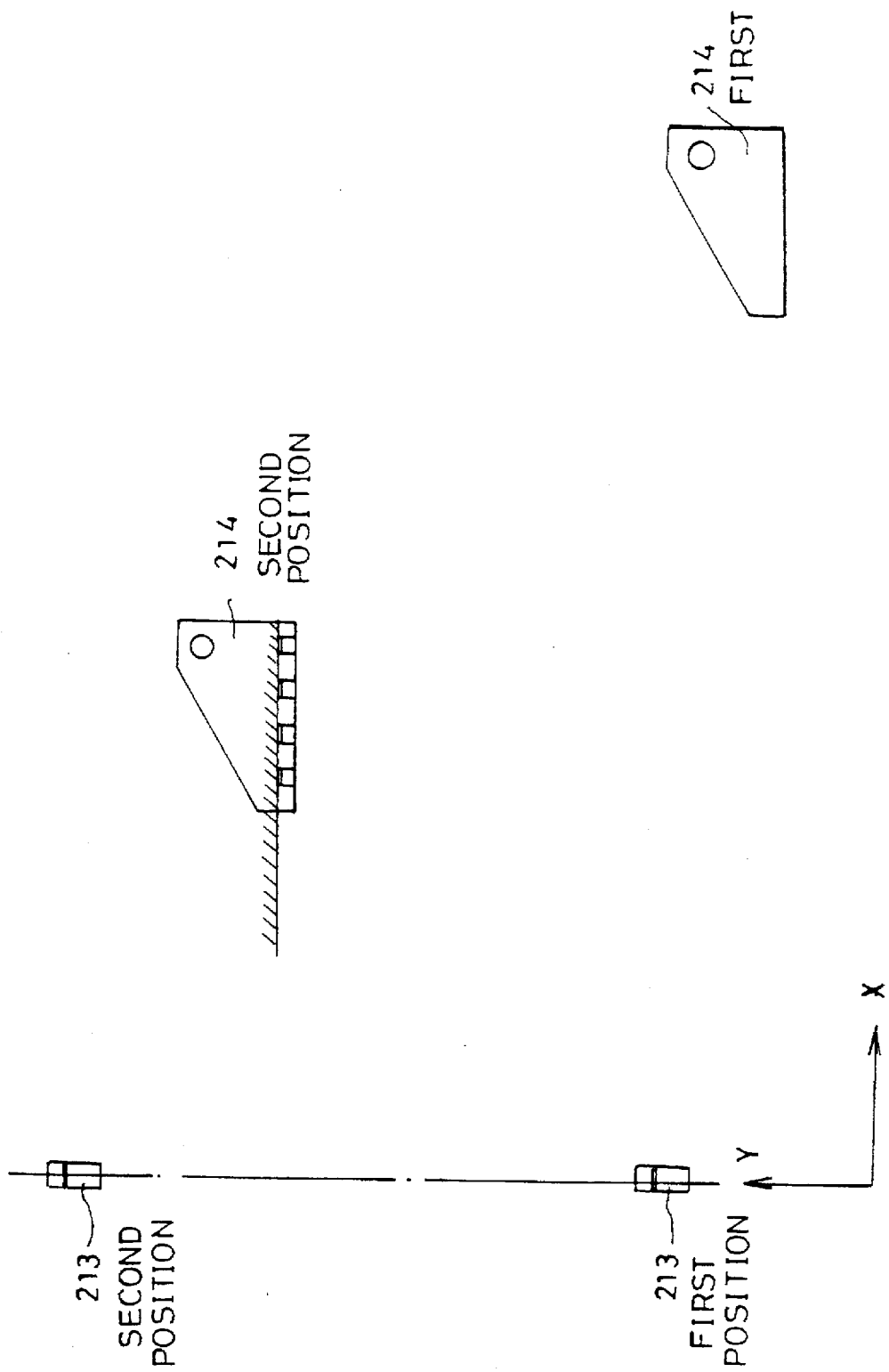
FIG. 6 is a view showing a relative position between an ID board detection apparatus and a hub lock release member of a certain cassette of a moving elements automatic transferring apparatus for a magnetic recording and reproducing apparatus of a third embodiment according to the present invention.

Referring to FIG. 5, the center of the reel tables 211 and 212 and the rotation center OA of the reel tables are connected with each other by first link members R1.

At this time, pin joints are provided at both ends of the first link members R1.

In addition, each rotation center OB of the hub lock release members 213 is connected by a second link member R2.

At this time, pin joints are provided at both ends of the second link member R2.

In addition, the rotation center OC of the ID board detection apparatus 214 and the ID board detection apparatus 214 are connected by a third link member R3.

At this time, pin joints are disposed at both sides of the third link member R3.

In addition, connection members P1, P1', P2, and P3 are provided at a predetermined portion of the link members R1, R2, and R3.

In addition, as shown in FIG. 9, a function plate 215 includes first, second, and third horizontal elongated openings 241, 241', 242, and 243 so as to guide the connection members P1, P1', P2 and P3 disposed at a predetermined portion in which connection members P1, P1', P2 and P3 can be inserted thereinto.

Here, the function plate 215 moves only in the Y-axis direction.

In more detail, the rotation center OA of the reel table is positioned at the same distance from the reel tables 211 and 212 when using a small size cassette "s" and a standard size cassette "S".

In addition, as the first link members R1 rotate by the movement of the connection members P1 and P1' each inserted into the horizontally elongated first openings 241, and 241' formed on the function plate 215 about the rotation center OA, the reel tables 211 and 212 can move to desired position such as a first position or a second position. Here, the second position is for a small size cassette "s" and the first position is for a standard size cassette "S".

In addition, the rotation center OB is positioned to be at the same distance from the hub lock release member 213 when using a small size cassette "s" or a standard size cassette "S".

In addition, as the second link member R2 rotates by the movement of the connection member P2 inserted into the horizontally elongated second opening 242 formed on the function plate 215, the hub lock release member 213 can move to a desired position.

Figure 7:
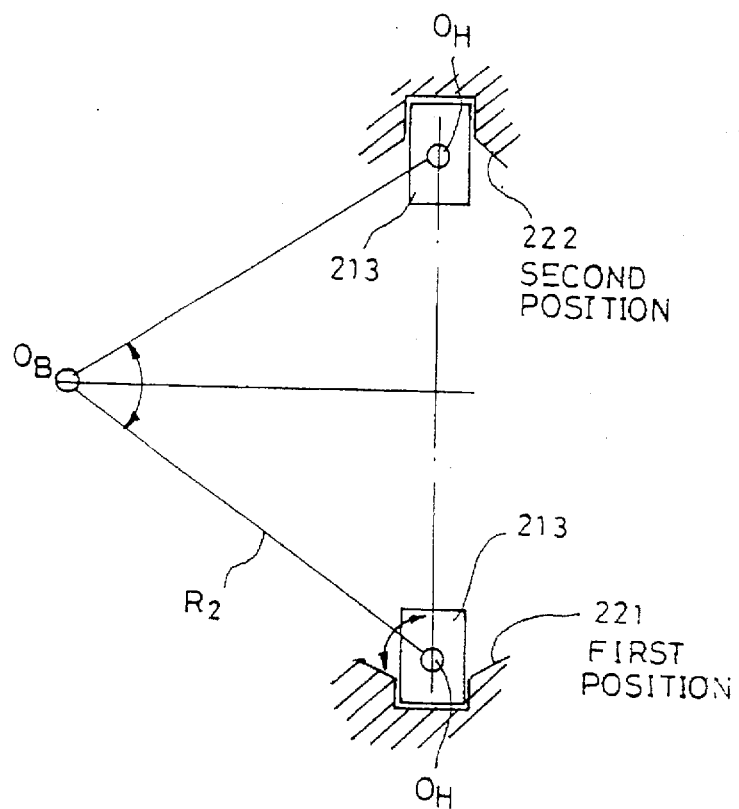
FIG. 7 is a view showing a moving operation of a hub lock release member of a moving elements automatic transferring apparatus for a magnetic recording and reproducing apparatus of a third embodiment according to the present invention.

At this time, as shown in FIG. 7, since rotation stopping members 221 and 222 are provided at both ends in the range of the movement of the hub release member 213, the rotation of the hub lock release member 213 about the center OH of the hub lock release member is limited, and the movements toward the first position and the second position are executed more precisely.

In addition, the rotation center OC of the ID board detection apparatus 214 is spaced apart at the same distance from each ID board detection apparatus 214 when using a small cassette "s" and a standard cassette "S".

In addition, as the third link member R3 rotates about the rotation center OC by the movement of the connection member P3 inserted into the horizontally elongated third opening 243 formed on the function plate 215, the ID board detection apparatus 214 can move to a desired position.

Figure 8:
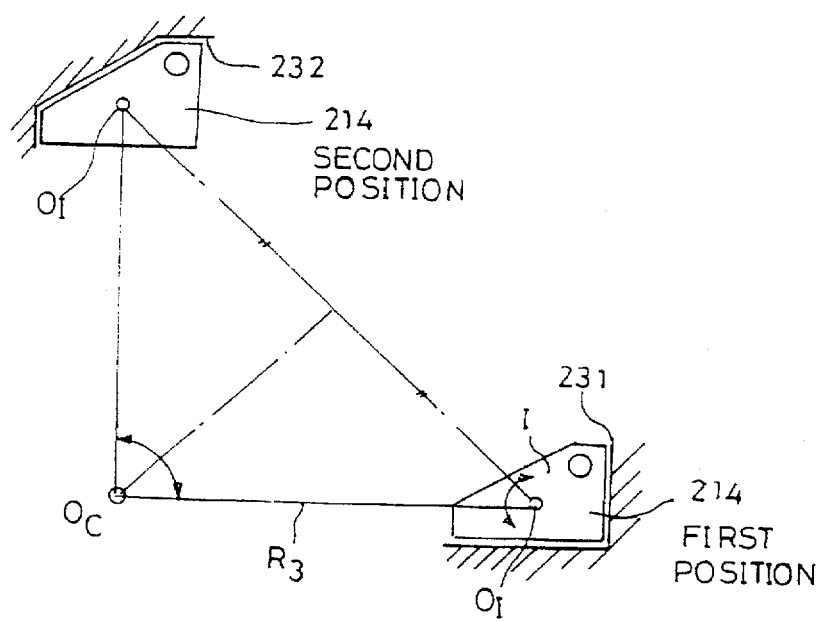
FIG. 8 is a view showing a moving operation of an ID board detection apparatus of a moving elements automatic transferring apparatus for a magnetic recording and reproducing apparatus of a third embodiment according to the present invention.

At this time, as shown in FIG. 8, the rotation of the ID board detection apparatus 214 about the center OI of the ID board detection apparatus 214 can be limited by providing the rotation stopping members 231 and 232 at both ends of the range within which the ID board detection apparatus 214 moves. In addition, the movements toward the first and second positions can be more precisely achieved.

Therefore, the moving distances yA, yB and yC toward the Y-axis of the connection bars should be the same when the connection members P1, P1', P2 and P3 move in accordance with a certain cassette such as a small size cassette "s" and a standard size cassette "S".

The operation of the third embodiment of the present invention will now be explained.

As drawn in the full line in FIG. 5, when a standard cassette "S" is inserted into the deck of the VCR, a sensor (not shown) detects the type of the cassette.

In state that the first link members R1 are connected between the reel tables 211 and 212 and the rotation center OA thereof, the second link member R2 is connected between the hub lock release member 213 and the rotation center OB thereof, and the connection members P1, P1', P2, and P3 formed on the third connecting member R3 connecting the ID board detection apparatus 214 and the rotation center OC thereof are inserted into the horizontally elongated openings 241, 242, and 243, respectively, as the function plate 215 moves toward the lower portion as shown in FIG. 9, the reel tables 211 and 212, the hub lock release member 213, and the ID board detection apparatus 214 move toward the first position.

Meanwhile, when a small cassette "s" is inserted thereinto, the function plate 215 moves toward the upper portion as shown in FIG. 9, and the reel tables 211 and 212 moves to the second position. In addition, the hub lock release member 213 and the ID board detection apparatus 214 move to the second position, respectively, as shown in FIG. 5.

As described above, the moving elements automatic transferring apparatus for a magnetic recording and reproducing apparatus is capable of moving reel tables, a hub lock release member, and an ID board detection apparatus for selective use between a small size cassette and a standard size cassette by providing a more simple construction compared with the prior art.

What is claimed is:

1. A moving elements automatic transferring apparatus, comprising:
    two reel tables;
    a reversibly rotatable pinion disposed between said reel tables;
    a plate having a slot, said plate being movable upwardly or downwardly;
    a rack engaged to a gear portion of said pinion, said rack being linearly movable;
    two connection bars, each having a first end connected to a respective one of said reel tables, and a second end provided with a pin, wherein one connection bar is hinged to the central position of said pinion and the other connection bar is rigidly connected to the pinion; and further wherein the pin provided at the second end of each connection bar is inserted into said slot.

2. The apparatus of claim 1, wherein said rack includes a hub lock release member disposed at one end thereof.

3. The apparatus of claim 1, wherein the slot is elliptical.

4. A moving elements automatic transferring apparatus, comprising:
    two reel tables;
    a plurality of reversibly rotatable pinions disposed between said reel tables, said pinions being intermeshed with each other;
    a rack being linearly movable by rotation of said pinions; and
    a pair of rotatable connection bars, each having one end engaged to a respective one of the reel tables and the other end rotatably engaged to the center portion of one of the pinions.

5. The apparatus of claim 4, wherein said rack engages a gear portion of one of said pinions thereby being movable by rotation of said pinions.

6. The apparatus of claim 4, wherein said rack includes a hub lock release member disposed at one end thereof.

7. A moving elements automatic transferring apparatus, comprising:
    two reel tables;
    a rotation center shaft of said reel tables disposed at the same distance from a position of the reel tables in which various kinds of cassettes are available;
    a pair of first link members having pin joints disposed at both sides thereof for connecting the reel tables and said rotation center shaft thereof;
    a pair of first connection members, each disposed at a predetermined portion of a respective one of said first link members;
    a hub lock release member;
    a rotation center shaft of said hub lock release member disposed at the same distance from the hub lock release member in which various kinds of cassettes are available;
    a second link member having pin joints at both sides thereof for connecting the hub lock release member and the rotation center shaft thereof;
    a second connection member disposed at a predetermined portion of said second link member;
    an ID board detection apparatus;
    an ID board detection apparatus rotation center shaft disposed at the same distance from said ID board detection apparatus in which various kinds of cassettes are available;
    a third link member having pin joints at both sides for connecting the ID board detection apparatus and the rotation center shaft thereof;
    a third connection member disposed at a predetermined portion of said third link member; and
    a function plate engaging each connection member and moving the connection members so as to move the reel tables, the hub lock release member, and the ID board detection apparatus toward a corresponding position for various kinds of cassettes.

8. The apparatus of claim 7, wherein said function plate linearly moves in a direction in which a certain kind of cassette is inserted.

9. The apparatus of claim 7, wherein said hub lock release member includes a rotation stopping member disposed at both sides of a range within which the hub lock release member moves.

10. The apparatus of claim 7, wherein said ID board detection apparatus includes a rotation stopping member disposed at both sides of a range within which the ID board detection apparatus moves.

11. The apparatus of claim 7, wherein said function plate includes a plurality of openings which engage the connection members.

12. The apparatus of claim 11, wherein each opening engages but a single one of the connection members.

13. The apparatus of claim 7, wherein said function plate moves all of the connection members simultaneously.

14. The apparatus of claim 7, wherein a straight moving distance for each connection member is the same when moving to accommodate a different kind of cassette.

15. A moving elements automatic transferring apparatus, comprising:

a plurality of reel tables;

a plurality of connection arms, each connection arm being connected at one end to a respective reel table, and at the other end to a rotation center; and means for moving the connection arms such that they rotate about their respective rotation centers, thereby moving the reel tables along an arcuate path between first and second positions.

16. The apparatus of claim 15, wherein said means include:

a plurality of pins, each pin arranged at a predetermined position of a respective connection arm; and a plate for engaging said pins and for moving said pins, thereby moving said connection arms.

17. The apparatus of claim 16, wherein said plate includes a plurality of openings, each opening engaging a respective one of said pins.

18. The apparatus of claim 15, wherein said means include:

at least one pinion operatively connected to said connection arms at their respective rotation centers.

19. The apparatus of claim 18, including a plurality of pinions, each pinion being fixedly connected to a respective one of said connection arms such that rotation of the pinion causes rotation of the connected connection arm.

* * * * *